Figure 1:
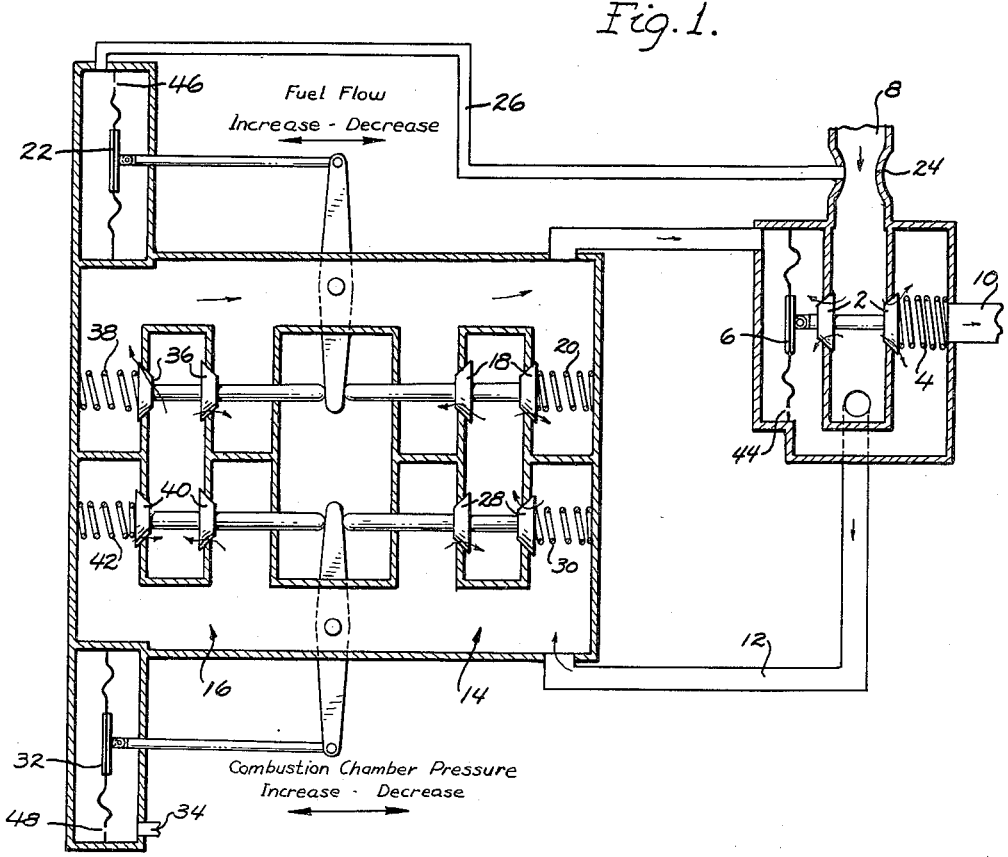

March 20, 1951 E. R. KLINGE 2,545,815
PULSE JET METERING UNIT
Filed Aug. 17, 1946

INVENTOR.
Earl R. Klinge
BY
Hauke & Hardesty
ATTORNEYS

Patented Mar. 20, 1951

2,545,815

UNITED STATES PATENT OFFICE 2,545,815

PULSE JET METERING UNIT

Earl R. Klinge, Detroit, Mich., assignor to Continental Aviation & Engineering Corporation, Detroit, Mich., a corporation of Virginia Application August 17, 1946, Serial No. 691,214

8 Claims. (Cl. 60—44)

This invention relates to a metering unit such as is used to control fuel flow in pulse jet engines.

The problem in this case is to develop a metering device which will continually attempt to satisfy the engine whether the engine is functioning properly or improperly and which is not dependent upon the validity of a calibration.

It is an object of this invention to provide a fuel metering device which continually attempts to satisfy the engine and which does not depend upon nozzle or other calibrations. This object is accomplished in a metering device in which a metering valve is operated by pressure responsive means and in which the pressure responsive means is actuated by a control pressure. The control pressure is varied by means responsive to combustion chamber pressure changes and by means responsive to fuel flow changes.

Figure 2:
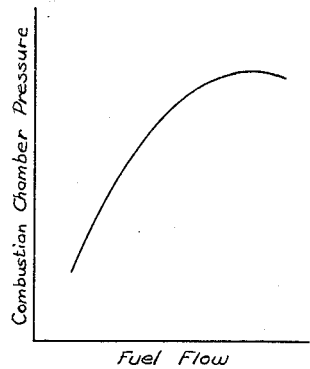

In the drawings:

Fig. 1 is a schematic showing of a metering device made according to the invention and Fig. 2 is a curve showing fuel flow plotted against combustion chamber pressure.

Referring now in particular to Figure 2, it can be seen that the curve obtained by plotting fuel flow against combustion chamber pressure reaches a maximum. It is desirable that engine operation be at or in the vicinity of this maximum point of the curve because the fuel flow for the highest combustion chamber pressure also provides best thrust. It is further desirable that operation control be accomplished from operation along that portion of the curve which is to the left of the maximum, because little is known about combustion charcteristics in operating ranges to the right of the peak. So long as the values for combustion chamber pressure and fuel flow fall to the left of the peak of the curve, the slope of the curve is positive whether the values be increasing or decreasing. To satisfy the engine, then, additional fuel should be supplied whether the pressure and fuel flow be increasing or decreasing.

Referring now in particular to Figure 1, a balanced metering valve 2 is shown as being biased toward the closed position by any suitable means such as spring 4. Valve 2 is connected to be operated by a pressure responsive device such as the diaphragm 6. Unmetered fuel is supplied under pressure through a fuel line 8 and metered fuel passes to the engine by means of line 10. Fuel under pressure is conducted to line 12 and is available to control the diaphragm 6. Line 12 is connected to pressure responsive device 6 through two parallel connected control channels indicated generally as 14 and 16. In each of these control channels there is disposed one valve responsive to fuel flow changes and another valve responsive to combustion chamber pressure changes. The channel 14 shows a balanced valve 18, biased closed by a spring 20, and connected to be opened by a pressure responsive device 22. The pressure responsive element of the device 22 is connected to a venturi 24 through the line 26 in such a way that fuel flow changes will be communicated to the device 22. A second balanced valve 28, biased closed by a spring 30, is connected to be opened by pressure responsive device 32 which has a connection 34 to the combustion chamber so that combustion chamber pressure changes can be communicated to the device 32.

Similarly, in control channel 16 balanced valve 36, biased closed by a spring 38, is connected to be openedl by the pressure responsive device 22 and a second balanced valve 40 in series with valve 36, biased closed by spring 42, is connected to be opened by pressure responsive device 32.

The diaphragm of device 6 is provided with a bleed port 44. The diaphragm of device 22 is provided with a bleed port 46, and the diaphragm of device 32 is provided with a bleed port 48. As will be well understood by those skilled in the art the bleed ports assure that rapid pressure changes on the opposite sides of the diaphragms will induce movement of the diaphragms. Very gradual pressure changes, however, will not operate the diaphragms because the pressure changes will be equalized.

*Operation*

In operation with fuel flow and combustion chamber pressure both decreasing, operation is at a point on the curve to the left of the peak and the values are moving down on the curve. The requirement is for additional fuel. With both the fuel flow and the combustion chamber pressure decreasing, valves 36 and 40 in the control channel 16 will open permitting control fluid to pass to the pressure responsive device 6 to open the valve 2 and admit additional quantities of metered fuel into line 10.

With both the fuel flow and the combustion chamber pressure increasing, engine operation is at a point on the curve to the left of the peak and is moving up on the curve. The requirement is nevertheless still for additional fuel. Accordingly, with fuel flow and combustion chamber pressure both increasing, valves 18 and 28 in the control channel 14 open to admit control fluid to the device 6 to open valve 2, admitting additional metered fuel to the line 10.

For any indication other than combustion chamber pressure and fuel flow both increasing or both decreasing, no control fluid is admitted through to the device 6. This occurs when the engine is operating on the peak of the curve or to the right of the peak. The requirement is for less fuel. Under these circumstances, spring 4 will start closing valve 2 and decrease the metered fuel flow into line 10. This will force the engine operation to a point to the left of the peak of the curve, whereupon the system operates in the manner already set forth above. The resulting oscillation will produce an average fuel flow somewhat to the left of the peak of the curve.

I claim:

1. A fluid flow control device comprising a valve means responsive to a control pressure to open the valve, fluid flow responsive and pressure responsive means coacting together to vary the control pressure to open the valve, said valve being connected to be opened only when the fluid flow and pressure are both increasing or both decreasing.

2. A fuel metering device comprising a valve, means responsive to a control pressure to open the valve, fuel flow responsive means and combustion chamber pressure responsive means coacting to vary the control pressure, said control pressure is not affected unless the fuel flow and combustion chamber pressure are either both increasing or both decreasing.

3. A device to control fluid flow to a fluid utilizer comprising a valve, means to bias the valve toward a closed position, means responsive to a control pressure to open the valve, means operatively responsive to both fluid utilizer pressure and fluid flow responsive means to vary the control pressure to open the valve, said valve being opened only when fluid utilizer pressure and fluid flow are either both increasing or both decreasing.

4. A device to control fluid flow to a fluid utilizer comprising a metering valve, pressure responsive means connected to operate the metering valve, a source of fluid under pressure connected to the pressure responsive means, two control valves disposed between the source and the pressure responsive means, means responsive to fluid utilizer pressure connected to operate one of the control valves, and means responsive to fluid flow connected to operate the other control valve.

5. The invention of claim 4, in which each of the last two means consists of a pressure sensitive device comprising a flexing diaphragm which is provided with a bleed port providing for escape of a limited amount of fluid pressure from one side of said diaphragm to the other, whereby to make same ineffective to slight variations in fluid utilizer pressure and fluid flow.

6. A device to control fluid flow to a fluid utilizer comprising a metering valve, pressure responsive means connected to operate the metering valve, a source of fluid under pressure connected to the pressure responsive means through two parallel connected control channels, two control valves disposed in each control channel, means responsive to fluid utilizer pressure connected to operate one of the control valves in each control channel, and means responsive to fluid flow connected to operate the other control valve in each control channel.

7. The invention of claim 6, in which the control valves in one channel are opened when fluid utilizer pressure and fluid flow are both increasing, and the control valves in the other channel are opened when fluid utilizer pressure and fluid flow are both decreasing.

8. The invention of claim 6, in which each of the last two means consists of a pressure sensitive device including a flexing diaphragm which is provided with a bleed port to equalize pressures on both sides of the diaphragm.

EARL R. KLINGE.

REFERENCES CITED

The following references are of record in the file of this patent:

UNITED STATES PATENTS

| Number | Name | Date |
|---|---|---|
| 1,869,144 | Green | July 26, 1932 |
| 2,212,606 | Klinker | Aug. 27, 1940 |
| 2,418,712 | Heymann | Apr. 8, 1947 |